US006108913A

United States Patent [19]

Tidwell

[11] Patent Number: 6,108,913

[45] Date of Patent: Aug. 29, 2000

[54] STRIPPING TOOL

[76] Inventor: John B. Tidwell, 3224 Brookings Ct., Fairfax, Va. 22031

[21] Appl. No.: 09/298,914

[22] Filed: Apr. 26, 1999

[51] Int. Cl.[7] .............................. B26B 3/00; B26B 13/02

[52] U.S. Cl. .............................. 30/194; 30/241; 30/254; 30/293; 30/294

[58] Field of Search ...................... 30/293, 294, DIG. 3, 30/237, 259, 241, 340, 254, 194

[56] References Cited

U.S. PATENT DOCUMENTS

| | | | |
|---|---|---|---|
| 2,601,450 | 6/1952 | O'Neill | 30/340 X |
| 4,646,437 | 3/1987 | Blomqvist | 30/294 X |
| 5,193,277 | 3/1993 | Zmijewski | 30/257 X |

FOREIGN PATENT DOCUMENTS

| | | | |
|---|---|---|---|
| 1074287 | 4/1953 | France | 30/294 |
| 2444537 | 7/1980 | France | 30/294 |
| 224564 | 3/1943 | Switzerland | 30/294 |

*Primary Examiner*—Douglas D. Watts
*Attorney, Agent, or Firm*—Richard C. Litman

[57] ABSTRACT

A stripping tool for removing clothing, and the like, in emergency situations. The present tool allows for clothing to be stripped from a patient quickly, safely, and efficiently. The stripping tool may be pulled toward the operator of the tool for quickness and ease of use. A handle provided to be used within the operators palm creates an ergonomic, comfortable grip. The handle allows a blade to be pulled upward in a scissoring motion to start a cut in fabric. Therefore, thicker, and heavier fabric may be removed since an initial cut may be made.

13 Claims, 5 Drawing Sheets

STRIPPING TOOL

FIELD OF THE INVENTION

The present invention relates to tools for removing clothing and the like. Still more particularly to a tool for stripping clothing quickly in emergency situations.

BACKGROUND OF THE INVENTION

Being able to remove clothing quickly in an emergency situation presents multiple problems. For accident victims, burn victims, and the like, clothing cannot be removed conventionally.

A patient should be moved, or jostled, as little as possible. For burn victims, accident victims, and others in emergency situations the clothing must be removed completely and quickly. Patients who are conscious may not be cooperative and endanger themselves as well as the operator who must remove the clothing.

Tools to remove clothing consist of open blades, such as knives, razor blades, and scissors. Open, exposed, blades put the patient and operator at risk of injury from the blade.

When using an open blade the cut must be somehow started, or else the cloth to be removed must not be thick or tough. Scissors have an advantage because they allow the operator to start a cut, or continue cutting, by squeezing two blades together.

Scissors also have finger holes and require the operator to place a thumb or finger within the hole for operation of the scissors. Fingers are prone to injury when having to remove clothes quickly, which may also be heavy, thick, wet, and burnt. The pushing and operation of scissors may cause injury when confronting resistance from clothing.

Scissors, and other tools with finger holes, require left-handed and right-handed versions. Operators may not have time to locate an appropriate version, use the incorrect version for them and injure themselves or obtain poor cutting ability.

Tools which require the pushing of a cutting tool to remove clothes are inefficient. These tools require the operator to push the tool away from the operator's body which takes more effort than pulling the tool toward the operator's body. As a tool is pushed away the operator's arm is farther from their body and the operator loses strength. As an operator pulls a tool toward them their arm becomes closer to their body and the operator gains strength.

Tools which are pushed away from the operator, or used in a scissoring fashion needlessly jostle the patient.

U.S. Pat. No. 5,590,471 ('471) discloses a bandage cutter which may be pulled toward the operator. Invention '471 has a rigid, stationary blade which must be sharp enough to start a cut in clothing. Invention '471 is disclosed to be used primarily on thinner cloth such as bandages and wraps due to one stationary blade.

Until the present invention, these needs and problems had not been met or solved.

SUMMARY OF THE INVENTION

The present invention is a tool for removing clothing and the like in emergency situations. The present tool allows for clothing to be stripped from a patient quickly, safely, and efficiently.

Blades for cutting the cloth are not exposed so as to puncture or cut the patient or operator of the tool. A flattened, molded, plastic arm fits neatly under clothing to guide the cloth into the blades which are secured in the mouth of the tool. The end of the plastic arm is slightly rounded so a patient, or operator, will not be punctured.

The present tool allows the operator to grip the tool by placing their hand over the top of the tool and curving fingers under the handle on either side of the tool's body for an ergonomically efficient grip. Wrist stress is greatly reduced. The present tool does not have finger holes to cause injury, and the hand is in a neutral position for comfort, efficiency, and control. Due to the manner of gripping the tool, a left-handed and right-handed version are not necessary.

As the tool is pulled, the ability to move a blade upward and downward during cutting by squeezing the handle allows an operator to get through sticking points, bunched clothing and the like. Squeezing the handle allows a blade to move upward in a scissoring motion to start a cut in the cloth. Therefore, thicker, and heavier fabric may be removed since an initial cut may be made.

The design of the present tool allows the tool to be pulled toward the operator. A pulling motion is more efficient than pushing. By pulling the tool, a patient will be jostled less and the operator maintains greater control and cutting strength. The pulling of the tool also allows clothing to be removed quickly. Due to the design, the tool may also be pushed.

BRIEF DESCRIPTIONS OF THE DRAWINGS

DETAILED DESCRIPTION OF THE INVENTION

Figure 1:
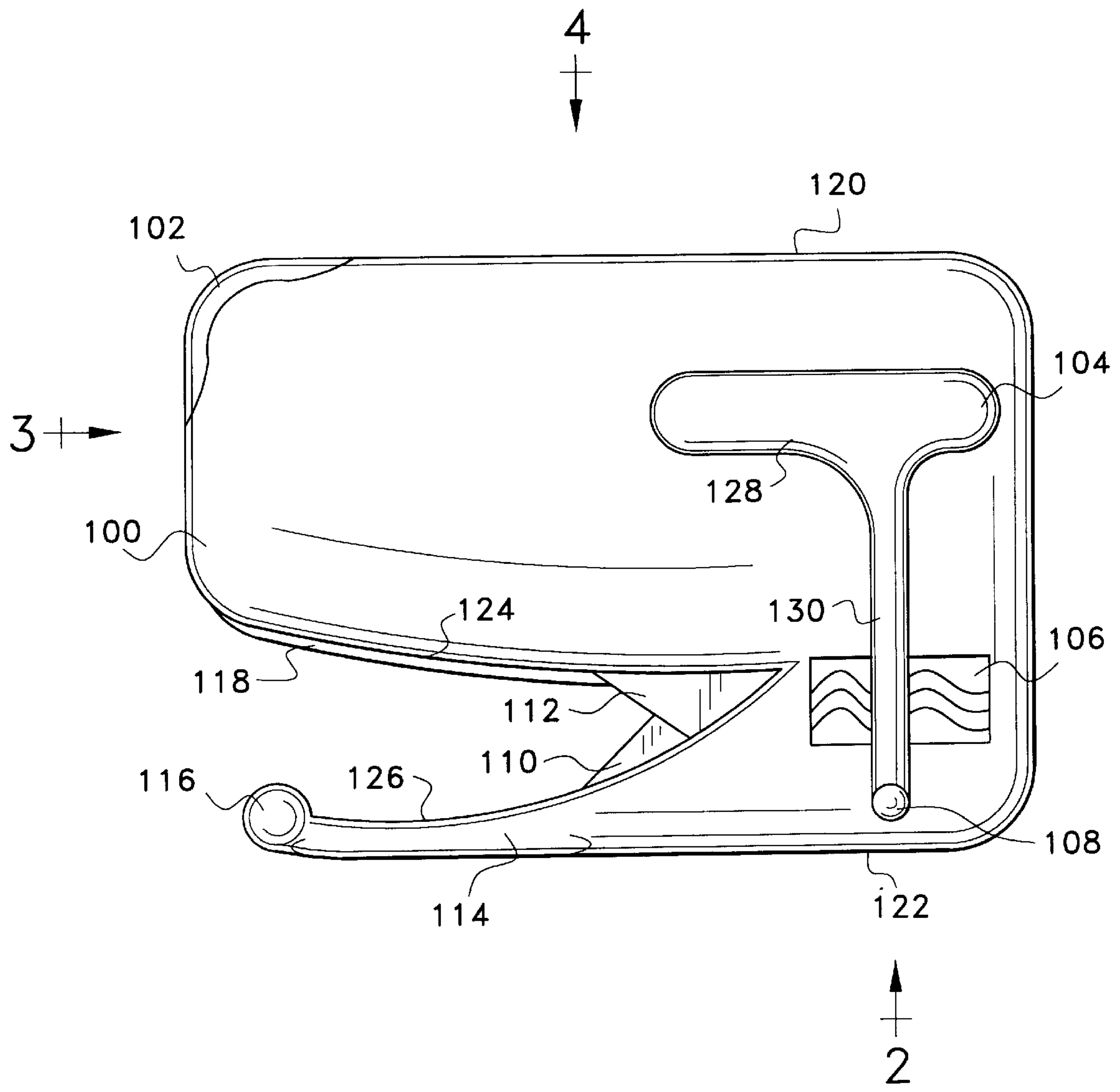
FIG. 1 is a side elevational view of the stripping tool.

Referring now to the figures, FIG. 1 shows a side elevational view of the preferred embodiment of the present invention stripping tool. The stripping tool includes a body 100, preferably made of rigid plastic, having a top surface 120 and a bottom surface 124. Extended arm 114, of body 100, has an upper surface 126, a lower surface 122, and a safety knob 116.

Bottom surface 124 of body 100 and upper surface 126 of extended arm 114 create a mouth for receiving cloth to be cut.

First blade 110 is secured to extended arm 114 of body 100. Second blade 112 is secured to bottom surface 124 of body 100. Cloth guide 118 slopes downward toward the mouth and is secured to bottom surface 124 of body 100. As cloth enters the mouth of body 100 cloth guide 118 guides the cloth onto first blade 110 and second blade 112 where the cloth is cut and ripped. Cloth is less likely to bunch up due to the sloping of cloth guide 118, which flattens out the fabric.

Figure 2:
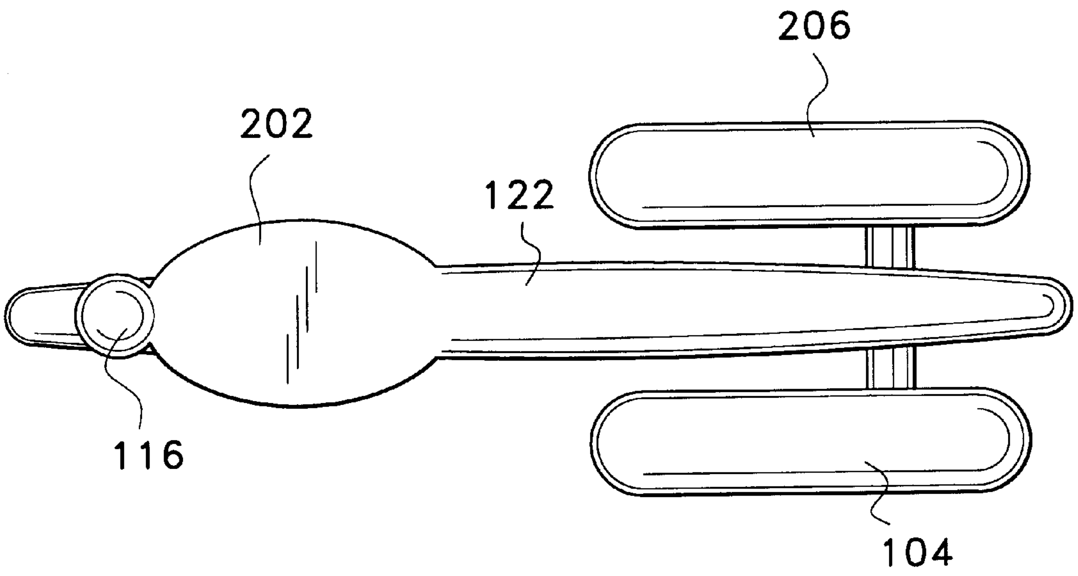
FIG. 2 is a bottom elevational view of the stripping tool.
Figure 3:
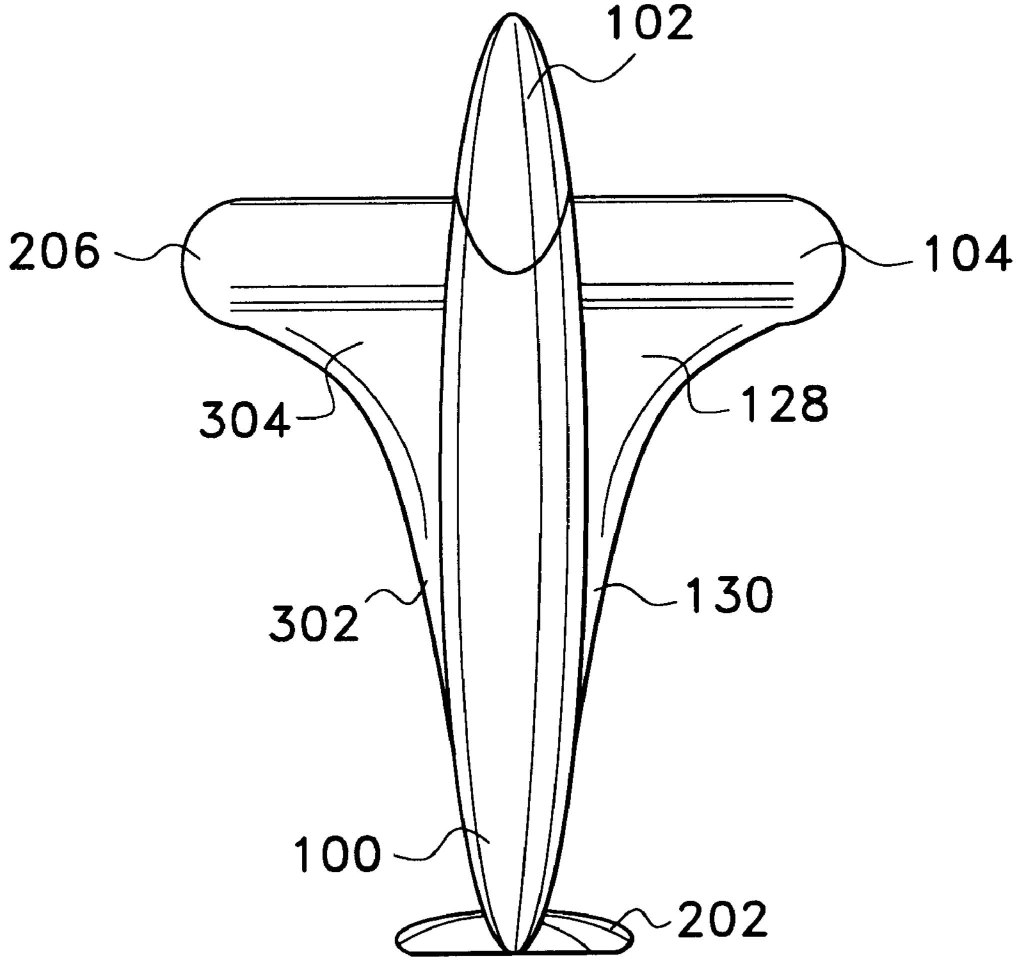
FIG. 3 is a rear elevational view of the stripping tool.
Figure 4:
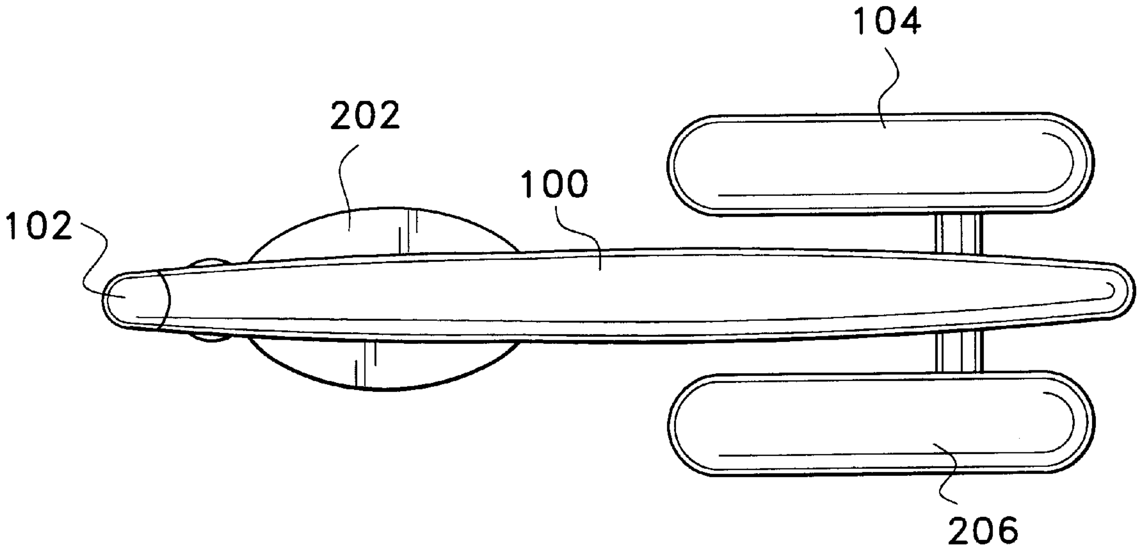
FIG. 4 is a top elevational view of the stripping tool.

A handle is secured to body 100 which consists of right handle 104 having bottom 130 and top 128, and left handle 206, shown in FIG. 2, 3 and 4, having bottom 302 and top 304, shown in FIG. 3.

Body 100 also has crumple zone 106. Crumple zone 106 is a softer less rigid plastic then the majority of body 100. Crumple zone 106 is flexible. The flexibility of crumple zone 106 allows extended arm 114 to be pulled toward bottom surface 124 of body 100, thereby moving first blade 110 toward second blade 112 creating a scissoring motion to initialize a cut in the cloth. Squeezing of handle 104 and handle 206 upward, toward top surface 120 of body 100, by the operator's fingers into the palm of the operator's hand in an effort to contract crumple zone 106 pulls extended arm 114 toward bottom surface 124 of body 100.

A palm heel rest 102 is secured to body 100 to provide the operator with a comfortable as well as ergonomic hand position. Palm heel rest 102 is preferably of a soft material, a different plastic in the same mold. Alternatively palm heel rest 102 could be of the same plastic.

FIG. 1 also shows handle pivot 108 protruding through body 100 into bottom 130 of right handle 104, and bottom 302 of left handle 206 securing both to body 100. It is preferable for right handle 104 and left handle 206 to be secured permanently to body 100 as one molded piece of plastic.

FIG. 2 is a bottom elevational view of the stripping tool. Left handle 206 and right handle 104 are attached to body 100. Extended arm 114 is shown having flat surface 202. Flat surface 202 allows extended arm 114 of body 100 to slip easily under cloth.

Safety knob 116 of extended arm 114 shields patients and operators from being pricked with the terminal end of extended arm 114.

FIG. 3 is a rear elevational view of the present stripping tool. Shown in FIG. 3 is body 100 having left handle 206 having bottom 302 and top 304, and right handle 104. Palm rest 102 of body 100 provides the operator with a comfortable position for their hand.

FIG. 4 is a top elevational view of the stripping tool. Body 100 is shown with palm rest 102, left handle 206 and right handle 104.

Body 100, extended arm 114, left handle 206, right handle 104, and cloth guide 118, are preferably made of a single piece of molded plastic.

Top 304 of left handle 206 is preferably not attached to body 100, while bottom 302 of left handle 206 is attached to body 100. Top 128 of right handle 104 is preferably not attached to body 100, while bottom 130 of right handle 104 is attached to body 100. A slight gap between top 304 of left handle 206 and body 100 and a slight gap between top 128 of right handle 104, along with crumple zone 106, allows the operator to pull the handles slightly upward toward top surface 120 of body 100, thereby moving extended arm 114 upward as crumple zone 106 contracts.

As an alternate embodiment, left handle 206 and right handle 104 may be separate pieces attached to body 100.

Figure 5:
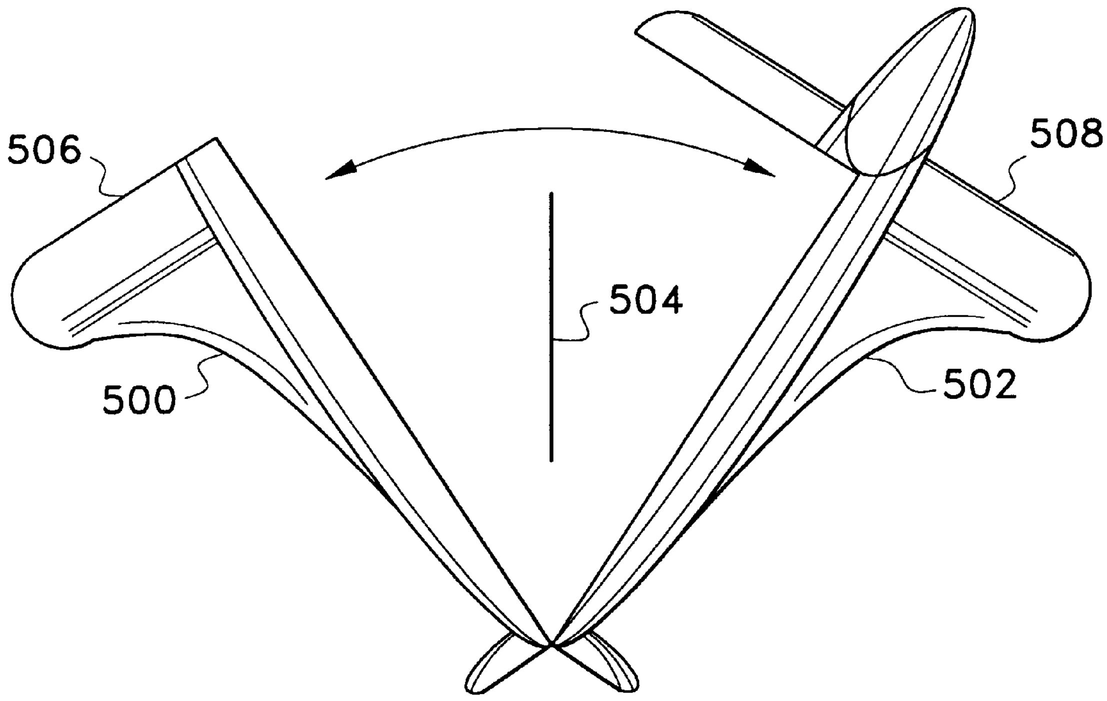
FIG. 5 is a rear view of the stripping tool molded pieces.

FIG. 5 is a rear view of the stripping tool molded pieces. Right handle 500 is a molded piece of plastic attached to left handle 502. Blade 504 is placed within left handle 500 and right handle 502 before the handles are closed. Once left handle 500 and right handle 502 are closed, blade 504 is held in place. Right handle top 506 is attached to left handle top 508 after the handles are closed.

A second embodiment provides for first blade 110 and second blade 112 to pivot on a shared axis provided by pivot pin 108. As right handle 104 and left handle 206 are squeezed the movement pivots first blade 110 and second blade 112 simultaneously about pivot pin 108 creating a scissoring motion.

In another embodiment the squeezing of the handles moves first blade 110 only. Extended arm 114 stays stationary while first blade 110 moves within extended arm 114 of body 100.

While the preferred embodiment and various alternative embodiments of the invention have been disclosed and described in detail herein, it may be apparent to those skilled in the art that various changes in form and detail may be made therein without departing from the spirit and scope thereof.

What is claimed is:

1. A stripping tool, comprising:

a body having a top surface and a bottom surface;

said body including an extended arm having a terminal end, an upper surface and a lower surface, wherein the bottom surface of said body and the upper surface of said extended arm define a mouth for receiving material to be cut;

a first blade secured to said extended arm, and a second blade secured at the bottom surface of said body; and a handle connected to said body and connected to said first blade and said second blade;

whereby upon pulling said handle toward the top surface said first blade moves toward said second blade, and upon releasing said handle said first blade moves away from said second blade creating a scissoring motion to initialize a cut.

2. The stripping tool according to claim 1, wherein said body further comprises:

a crumple zone having flexibility within said body for allowing the movement of said handle relative to said body.

3. The stripping tool according to claim 1, wherein said first blade and said second blade pivot on a shared axis, the shared axis being attached to said handle such that the movement of the handle moves said first blade and said second blade simultaneously.

4. The stripping tool of claim 2, wherein the flexibility of the crumple zone allows the extended arm to be pulled toward the bottom surface of said body, thereby moving said first blade toward said second blade creating a scissoring motion to initialize a cut.

5. The stripping tool of claim 1, wherein said handle is connected directly to said blade thereby moving said blade independently of said body.

6. The stripping tool of claim 1, further comprising:

a palm heel rest formed on said body.

7. The stripping tool of claim 1, further comprising:

a cloth guide secured to the bottom surface of said body.

8. The stripping tool of claim 1, wherein the terminal end of the extended arm is flattened to fit in tight places.

9. The stripping tool of claim 1, wherein the terminal end of the extended arm is rounded for safety.

10. The stripping tool of claim 2, wherein the crumple zone is of a flexible molded plastic material capable of being compressed.

11. A stripping tool comprising:

a body having a top surface and a bottom surface;

said body including an extended arm having an upper surface and a lower surface, wherein the bottom surface of said body and the upper surface of said extended arm define a mouth for receiving material to be cut;

a blade secured to said body; and a handle connected to said body and connected to said blade, said handle having a top and a bottom, wherein said body and said handle are integral and the top of said handle is separated from said body and the bottom of said handle is molded as part of said body such that said handle may be moved relative to said body;

whereby pulling said handle toward the top surface, said blade moves toward the top surface, and releasing said handle thereby lowering said handle toward the bottom surface moves said blade away from the top surface creating a scissoring motion to initialize a cut.

12. The stripping tool of claim 11, wherein said body and said handle are of a molded plastic material.

13. The stripping tool of claim 1, wherein said body and said handle are separate manufactured pieces.

* * * * *